Jan. 13, 1970  L. P. SLIVKA  3,489,018
GYRO ERECTION SYSTEM
Filed April 27, 1967  5 Sheets-Sheet 1
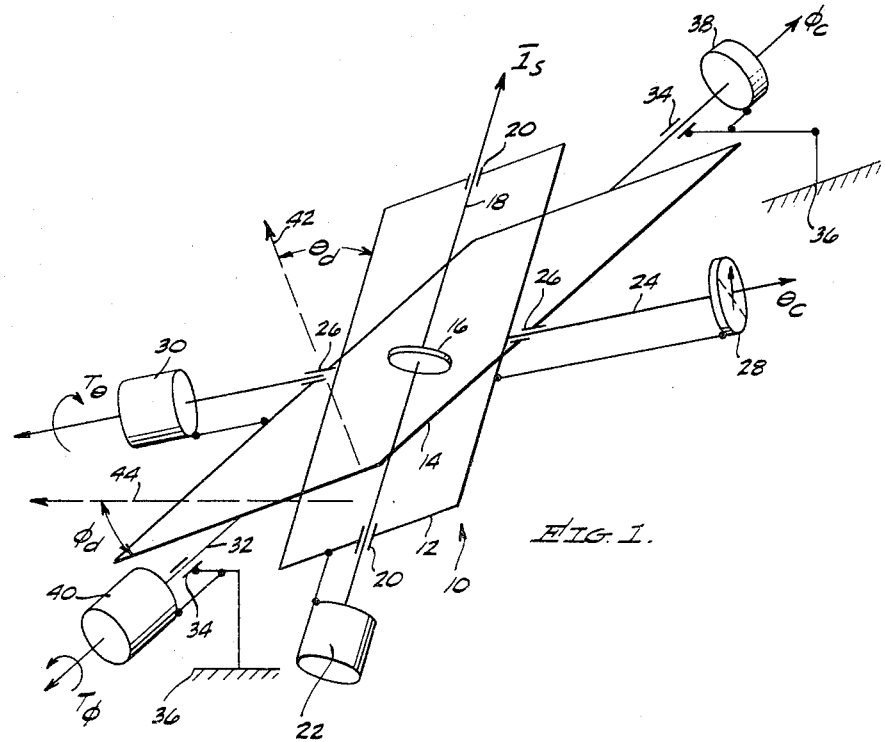
FIG. 1.
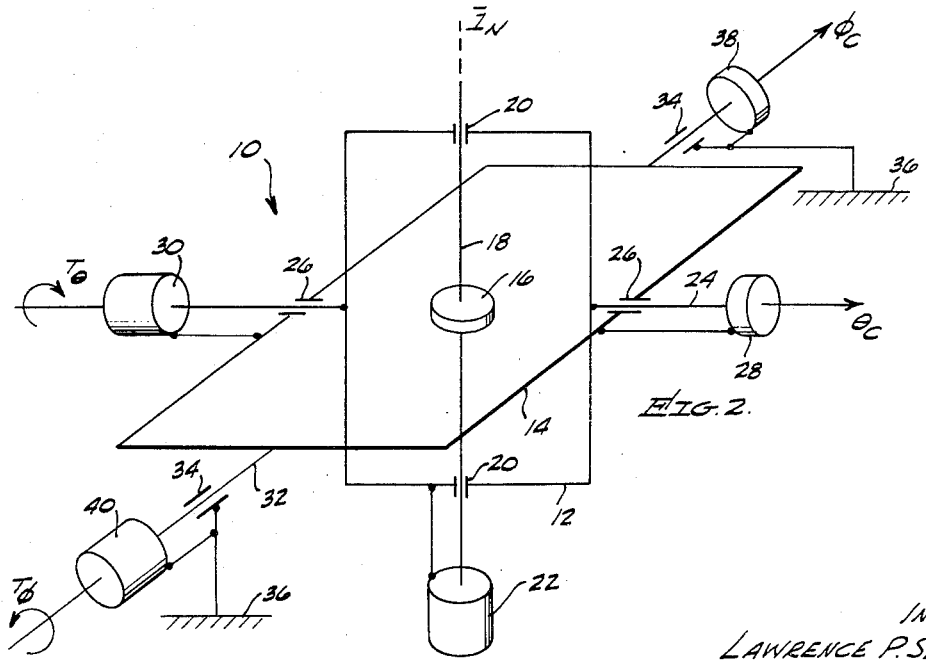
FIG. 2.
INVENTOR
LAWRENCE P. SLIVKA,
BY
ATTORNEY.

$\beta = 35°$
$\omega = 0$ $\beta = 35°$
$\omega = MAX.$ $\beta = 35°$
$0 \leq \omega \leq MAX.$

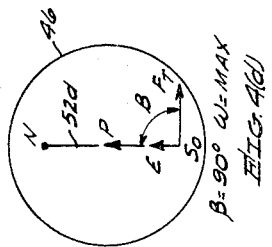
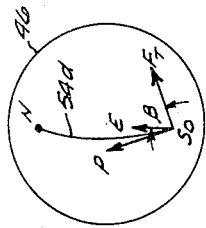
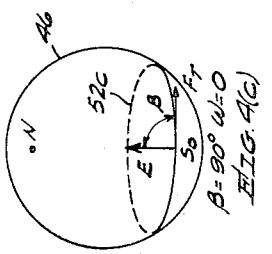
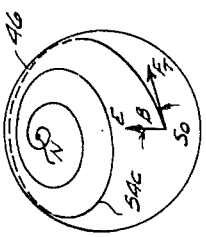
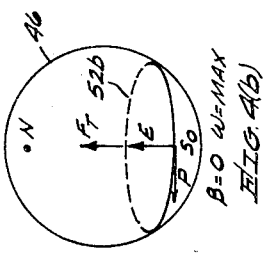
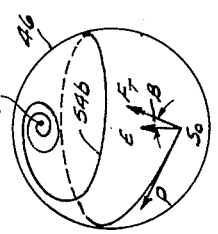
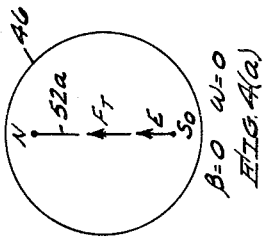
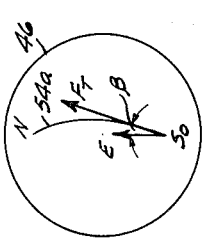

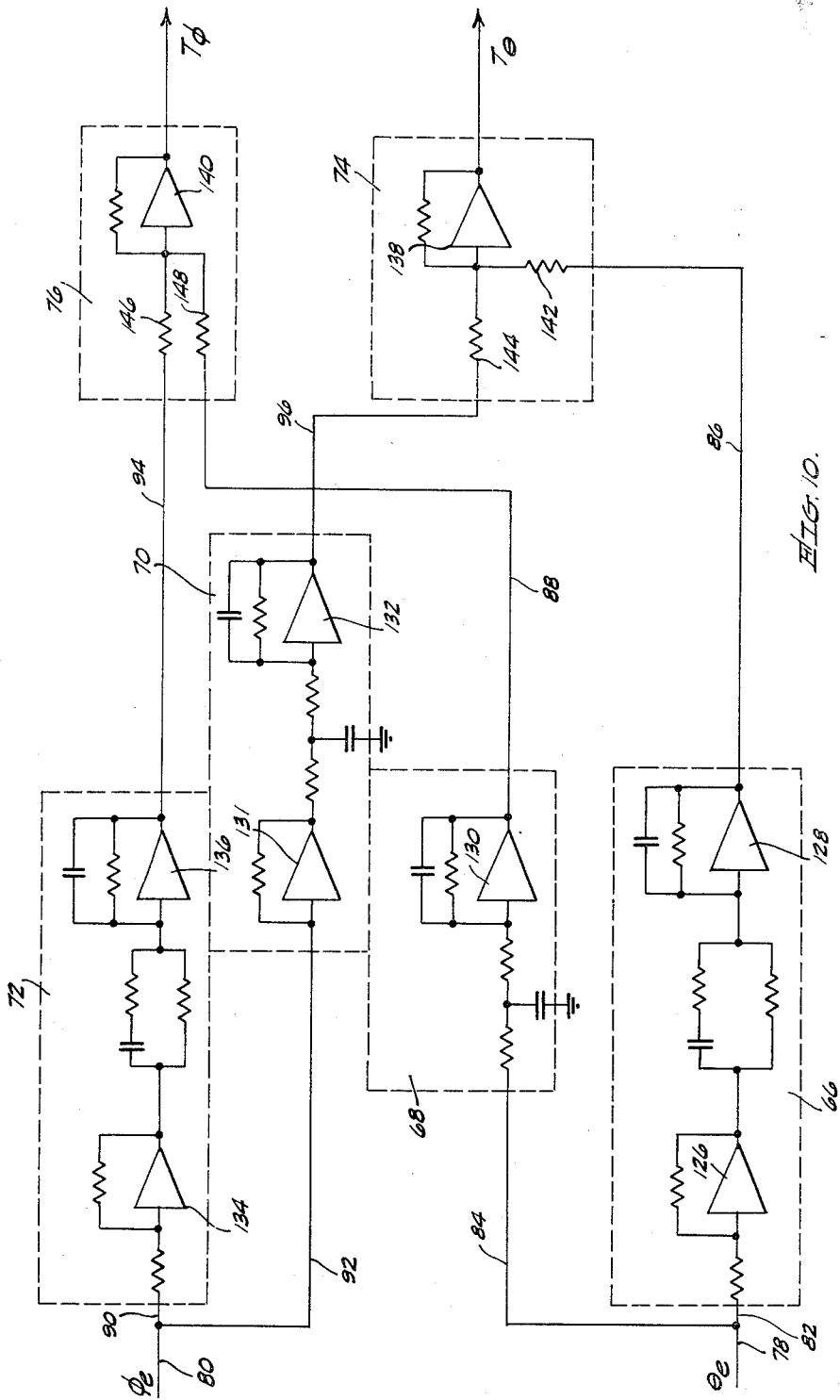

United States Patent Office 3,489,018
Patented Jan. 13, 1970

3,489,018
GYRO ERECTION SYSTEM
Lawrence P. Slivka, Santa Monica, Calif., assignor to Hughes Aircraft Company, Culver City, Calif., a corporation of Delaware
Filed Apr. 27, 1967, Ser. No. 637,034
Int. Cl. G01c 19/30, 19/46
U.S. Cl. 74—5.42        10 Claims

ABSTRACT OF THE DISCLOSURE

A system for rapidly erecting an inertial mechanism for any value of gyro wheel angular momentum, whether zero, intermediate, full or during spin-up or spin-down. Gimbal attitudes are combined with the desired attitudes to produce an error signal for supply to a novel summing network which includes a transformation matrix having four mechanisms each of which contains frequency dependent elements. The components of the error signal are condition, crossed and rotated through a predetermined angle in order to obtain control signals which are fed to gimbal torquers. The combination of the error components is expressed as a ratio which is the tangent of the angle through which the torquer control signals are rotated from the position error signal. The angle is selected so that the path of the spin axis during erection will traverse the shortest distance and so that both electrical and mechanical disturbances are compensated.

The present invention relates to inertial mechanisms and, more particularly, to a system for rapidly erecting an inertial mechanism for any value of angular momentum of the gyro element, whether the angular momentum is increasing, decreasing or constant.

All inertial mechanisms, regardless of their intended use, have the common requirement of initial alignment or erection. The achievement of initial alignment has, in the past, been time consuming and logically complicated. Conventionally, erection of an inertial mechanism such as a gyroscope is attempted only when the gyro element or wheel is spinning at a high angular momentum so that the signals to the torquers produce the torquer derived forces which, because of the phenomenon of precession, are directed to act only perpendicular to the direction of movement of the spin axis toward its erected position.

In erection of antennae where there is no spin, the force applied to the axis of the antenna is directed toward the desired position of the axis. Such an electro-mechanical antenna erection configuration is not useful for erecting gyroscopes because, when the gyro element or wheel is brought up to maximum spin after initial alignment at zero wheel spin has been achieved, the spin-up torques disturb the sense of reference and the zero spin erection configuration is not able to restore the gyroscope to its formerly erected position because of the phenomenon of precession.

When the angular momentum of the wheel is at some non-zero value, an error inheres in the erection process because of nutation oscillations which cause the gyroscope to become unstable. In many older, relatively imprecise gyroscopes, friction was able to damp out the nutation oscillations. However, more recent gyroscopes have been built with such a high degree of precision that frictional losses are minimal. These newer gyroscopes, therefore, cannot utilize friction for stabilization purposes since the frictional disturbances are unable to damp out the nutation oscillations.

To overcome the inability of friction to stabilize the gyroscope, electronic means have been added to the inertial mechanism equipment; however, the additional electronics are effective only when the gyro wheel has attained a fairly high speed. In fact, at lower wheel speeds the additional electronics abet nutation oscillation and the inertial mechanism cannot be easily stabilized. Consequently, when the gyroscope is erected at zero wheel speed, the electronics must be disconnected from the circuit. Within a range of intermediate wheel speeds, the methods of erection at either zero wheel or high wheel speed cannot be used. In addition, if the gyroscope were first erected at zero wheel speed and then brought up to its desired wheel speed, the original sense of reference would be lost during spin-up, as stated above.

Furthermore, the time of erection is inversely proportional to wheel speed so that, when the wheel speed is zero, the erection is immediate and, when the wheel speed is at a high value, the erection encompasses an interval of some minutes. In many instances, this time delay is not tolerable. Because of these several problems, the advantages and disadvantages between the time of erection and the loss of the sense of reference must be considered, and since the latter creates greater difficulties than the former, erection at zero wheel speed is not used.

The present invention overcomes these and other problems by providing a means by which an inertial mechanism may be erected rapidly at any value of angular momentum of the gyro element. The invention also provides for an adjustment of the electro-mechanical parameters of the inventive apparatus so that alignment of the inertial mechanism may be made most efficient for any specific value or values of angular momentum. Consequently, the erection process may be adjusted to be most rapid when it is known that erection will take place at zero, intermediate, full or any changing angular momentum, including erection during "spin-up" or "spin-down" of the gyro wheel.

The present invention accomplishes these broad objectives by use of a novel summing network which acts upon the gimbal attitude signals to transform synchro signals into torquer control signals. Briefly, the present attitude of the spin axis is sensed by conventional gimbal synchros or signal generators. The synchros produce signals which are proportional to the gimbal attitudes, that is, to the angular components of the present attitude. These components are compared to the components of the desired attitude of the spin axis wherein the desired attitude is correlated to a reference position. From this comparison are produced the components of an error or deviation signal. Preferably, the present invention utilizes a single synchro resolver on each gimbal axis to perform the comparisons and to produce the error signal components. The summing network combines these angular components of the deviation between the non-erected or partially erected gimbal attitude and the desired gimbal attitude. The combination is performed by shaping devices which condition and cross the components of the error signal and rotate them through a predetermined angle in order to obtain the torquer control signals. The torquer control signals or gimbal component control signals actuate conventional gimbal torquers which exert a force couple on the spin axis so that the axis will move from its present position toward the desired attitude.

The summing network, in the preferred embodiment for an illustrative two-degree-of-freedom gyroscope, comprises a transformation matrix including four mechanisms each of which contains frequency dependent elements. The mechanisms are cross-coupled between the signals representing the position error coordinates or components of the gimbal axes in such a manner that the signal representing a coordinate of the position error of one of the gimbal axes is combined with the signal representing a coordinate of the position error of another of the gimbal axes. The combination of the gimbal error coordinates is expressed as a ratio which is the tangent of the angle through which the torquer control signals are rotated from the position error signal. The torquer control signals are then amplified for transmission to their respective torquers. In addition, the time-rate-of-change of each of the position error components is combined with its position error by means of the frequency-dependent elements to assure smooth erection with little or no overshooting of the desired position. The frequency dependent shaping which provides smooth response of the gimbal structure at zero wheel angular momentum also functions to prevent the gyro's mechanical nutation oscillations at other-than-zero wheel momentum.

By means of its novel mechanization, the invention also permits a gyroscope to be erected at any angular momentum of the gyro wheel from zero to maximum and to maintain the erected position during subsequent change in angular momentum whether increasing or decreasing with a selected value of the ratios of the gains. The erection paths will depend on the value selected for the selected ratio. In most situations the inertial mechanisms are erected at the time when the angular momentum is increase from zero to maximum; consequently, the gains are selected so that their ratio will produce an angle of approximately 35°. In all cases, the angle is selected so that the path of the spin axis during erection will traverse the shortest distance, thereby effecting the fastest possible erection. In so doing, both electrical and mechanical disturbances are compensated while the inertial mechanical is erected with great rapidity.

It is, therefore, an object of the present invention to provide for erection of inertial mechanisms in the shortest possible time.

Another object is the provision of an erection mechanism having the fastest erection time at any value of angular momentum, whether the angular momentum is increasing, decreasing or constant.

Another object is to provide an erection system which is adjustable with respect to any angular momentum to provide the most rapid erection at specific angular momentums.

Other aims and objects as well as a more complete understanding of the present invention will appear from the following explanation of an exemplary embodiment and the accompanying drawings thereof, in which:

FIG. 1 schematically depicts a two-degree-of-freedom gyroscope before erection;

FIG. 2 depicts the gyroscope of FIG. 1 after erection;

FIG. 3 schematically depicts the spin axis and rotor of the gyroscope shown in FIGS. 1 and 2 within a sphere in its original unerected position and in its final erected position;

FIGS. 4(a)–(d) depict the path of the spin axis on a sphere during erection when the angle between the deviation error and the correctional torquer force is 0° or 90° and when the angular velocity of the gyro element is zero or maximum;

FIGS. 5(a)–(d) are views similar to FIGS. 4(a)–(d) but when the angle is 1° or 89°;

FIG. 10 depicts one embodiment of the electronics used in the summing network illustrated in FIG. 9.

Figure 3:
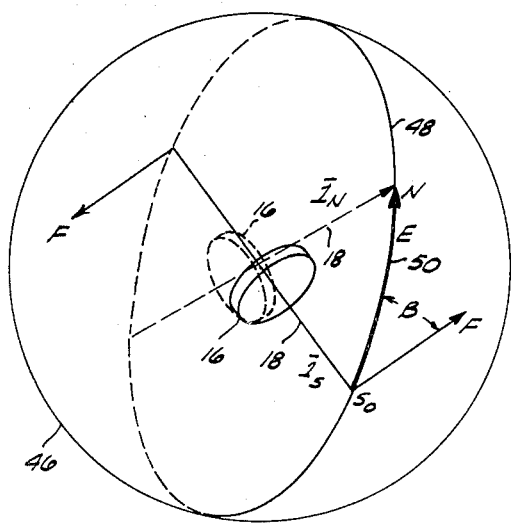

Although FIGS. 1–10 specifically illustrate one embodiment of the invention relating to a free gyroscope, it is to be understood that the present invention is directed to all inertial devices having at least two degrees of freedom, such as inertial platform systems.

Accordingly, as shown in FIGS. 1 and 2, a two-degree-of-freedom gyroscope 10 comprises an inner gimbal 12 and an outer gimbal 14. The inner gimbal rotatably supports a gyro element or wheel 16 on a shaft 18 in journal bearings 20. A spin motor 22 is connected to shaft 18 and inner gimbal 12 in order to rotate the wheel at an angular velocity and angular momentum. Inner gimbal 12 is supported on a shaft 24 which is journaled within outer gimbal 14 in bearings 26 in such a manner that shaft 24 is orthogonal to shaft 18.

A synchro or sensor 28 is connected between shaft 24 and outer gimbal 14 in order to sense angular disposition of inner gimbal 12 with respect to a reference position. A torque motor 30 is likewise secured between outer gimbal 14 and shaft 24 to exert a torque on inner gimbal 12. Outer gimbal 14 is supported on a shaft 32 in bearings 34 for rotation with respect to a vehicle 36 and shaft 32 is orthogonally disposed with respect to shaft 24. A synchro or sensor 38 and a torque motor or torquer 40 are secured between vehicle 36 and shaft 32 for sensing the angular disposition of outer gimbal 14 with respect to a reference position and for applying a torque to the outer gimbal, respectively. Synchro 28 senses the angle $\theta$ while torquer 30 applies a torque $T_\theta$. Similarly, synchro 38 senses the angle $\phi$ while torquer 40 applies a torquer $T_\phi$.

As depicted in FIG. 1, gyroscope 10 is shown in one position before erection wherein shaft 18 is disposed along a spin axis $\bar{l}_s$. It is desired to erect the gyroscope with respect to a reference position in such a manner that inner gimbal 12 rotates an amount $\theta_d$ to a reference $\theta$ as depicted by dashed line 42. Outer gimbal 14 is also desired to be erected to its reference position as denoted by reference $\phi$ through a rotation denoted by the angle $\phi_d$ as indicated by dashed line 44. When fully erected, the gyroscope of FIG. 1 assumes the position depicted in FIG. 2 so that shaft 18 will be disposed along a spin axis $\bar{l}_N$, at which time the gyroscope is able to perform its assigned task.

FIG. 3 is a representative view of the gyroscope of FIGS. 1 and 2 in both its non-erected and erected positions wherein the gyroscope is supported within a unit sphere 46. The torquers, synchros and gimbals are not illustrated to simplify the following descriptions; however, it is to be understood that the operation of the invention requires their use. Gyro wheel 16 and shaft 18 are shown in solid lines to represent the non-erected position of spin axis $\bar{l}_s$ while the gyroscope is shown in phantom to represent the desired erected position of spin axis $\bar{l}_N$. The spin axis intersects a great circle 48 of sphere 46 at unerected intersection $S_0$ and at erected intersection N. In order to erect the gyroscope, the intersection of the spin axis with great circle 48 must move along an arc 50 of the great circle. This distance of movement is the error by which the spin axis deviates from its erected attitude and is represented by arrow E, the significance of which will become apparent hereinafter. In order to move the spin axis from intersection $S_0$ to intersection N, a force couple F—F, produced by torquers 30 and 40, must be applied to the spin axis. The force couple is displaced from the error quantity E by an angle $\beta$ in order that the erection path and the time of erection is a minimum.

FIGS. 4–8 illustrate different spiral paths which one end of the spin axis would trace on the surface of unit sphere 46 during the process of erection. It is to be understood that the other end of the spin axis traces similar paths. The shape and direction of the particular spiral path depends upon the kinematics of the gyroscope because the kinematic behavior of a gimbal structure containing a gyro wheel changes radically as spin power is applied and the wheel spins. Without wheel spin, a torque applied to a gimbal axis causes the structure to angularly accelerate about that axis. With sufficient wheel spin, a torque applied to the gimbal axis causes the structure to move orthogonally to that axis. This orthogonal motion arises because, when a torque is applied to a sufficiently spinning wheel, the spin vector of the wheel precesses to align itself with the torque vector. Thus, the motion is then orthogonal to both the applied torque vector and the wheel spin vector and, for a wheel spinning in a Cardan suspension, a torque applied about one gimbal axis causes precession about the other gimbal axis.

As stated above, with reference to FIG. 3, the gyro wheel and spin axis are shown within a unit sphere whose center coincides with the center of the wheel. The unerected spin axis $\bar{l}_S$ intersects the surface of the sphere at point $S_o$ and illustrates the present unerected position of the wheel and spin axis. The desired erected position of the wheel is indicated where spin axis $l_N$ intersects the surface of the unit sphere at point N. The distance between intersections $S_o$ to N illustrates the difference between the present position and the desired position of one terminus of the spin axis and is referred to as the position error E, which is expressed by its components $\theta_e$ and $\phi_e$. A summing network accepts the error components $\theta_e$ and $\phi_e$ and produces torquer control components $T_\theta$ and $T_\phi$. When torques $T_\theta$ and $T_\phi$ are applied by torque motors 30 and 40, the resultant torque applied to the wheel is in the direction indicated by the force couple F—F. The direction of forces F—F are displaced at angle $\beta$ from the position error E, the rotation through angle $\beta$ having been accomplished in the summing network, as will become more apparent hereinafter. When forces F—F act upon the wheel, the path traversed takes one of several forms as illustrated in FIGS. 4–8. In all cases, the present unerected position of the spin axis $\bar{l}_S$ intersects sphere 46 at point $S_o$, the final erected position of axis $\bar{l}_N$ intersects the sphere at point N, and any instantaneous intersection is represented by point S.

As shown in FIGS. 4(a)–(d), movement of the gyro spin axis follows radically different paths when angle $\beta$ is either 0° or 90° and when the rotor angular velocity, and consequently its angular momentum, is either zero or maximum. In FIG. 4(a) the resultant force $F_T$ exerted by the torquers is colinearly applied with the position error E such that angle $\beta=0°$. Since the angular velocity $\omega$ is zero, no precessional forces are aroused and the erection path 52a comprises a segment of the great circle of sphere 46 and erection is practically immediate. In FIG. 4(b), angle $\beta=0°$ but the angular velocity is maximum. Thus, a precessional force P is aroused by torquer force $F_T$ orthogonal thereto. Since $F_T$ is colinear with error E, the spin axis follows path 52b and the gyroscope never is rected. FIG. 4(c) represents the situation where $\beta=90°$ and $\omega=0$ so that path 52c resembles path 52b with the exception that the spin axis moves oppositely thereto. FIG. 4(d) shows a path 52d when $\beta=90°$ and $\omega=$maximum so that the precessional force P causes the spin axis to move along the arc of the great circle defined by error E. It is obvious, therefore, that gyro erection would never be attempted when angle $\beta=0°$ and $\omega=$maximum and when angle $\beta=90°$ and $\omega=0$ since erection would never occur as depicted by paths 52b and 52c of FIGS. 4(b) and 4(c). It is less obvious that gyro erection is not attempted in practice when $\beta=0°$ and $\omega=0$ because the sense of reference obtained thereby is lost when the angular velocity is increased to its maximum value.

FIGS. 5(a)–(d) represent angle $\beta$ being equal to either 1° or 89° and the angular velocity being either zero or maximum and illustrate, through comparison with FIGS. 4(a)–(d), the change in paths which the spin axis follows. In FIG. 5(a) $\beta=1°$ and $\omega=0$. Therefore, torquer force $F_T$ is slightly displaced from position error E and path 54a followed by the spin axis is slightly displaced from and slightly longer than path 52a depicted in FIG. 4(a). Erection thus is slightly longer. In FIG. 5(b) when $\beta=1°$ and $\omega=$maximum, path 54b is long and greatly spiraled because of the action of the precessional force P and erection encompasses a large span of time. A comparison between path 54b of FIG. 5(b) and path 52b of FIG. 4(b) illustrates how circular path 52b is transformed when angle $\beta$ is increased to 1° at $\omega=$maximum. A path 54c similar but opposite in direction to path 54b is followed when $\beta=89°$ and $\omega=0$, as shown in FIG. 5(c). A comparison between FIGS. 4(c) and 5(c) illustrates how large spiral path 54c evolves from circular path 52c when agle $\beta$ is decreased 1°. FIG. 5(d) illustrates a path 54d which is followed by the spin axis when $\beta=89°$ and $\omega=$maximum and corresponds to path 54a of FIG. 5(a) and path 52d of FIG. 4(d). Furthermore, as long as angle $\beta$ is greater than 0° and less than 90°, the spin axis will eventually be erected regardless of wheel spin momentum.

It is obvious, therefore, that a specific erection path depends upon the particular values of angle $\beta$ and angular velocity $\omega$ and that the present invention provides for a means by which angle $\beta$ may be adjusted and set to minimize the length of the erection path and the time of erection.

The present invention also provides a means for erecting a gyroscope at values intermediate to 0° and 90° of the angle $\beta$ between the torque forces $F_T$ and the position error E and at any angular velocity or momentum. It is preferable to erect a gyroscope at the same time that its rotor is brought up to its maximum angular velocity. If both erection and spin angular velocity begin and terminate simultaneously, then the preferable angle $\beta$ is 45°. However, erection by means of the invention has a shorter time duration than the time of maximizing the angular velocity and, therefore, the angle $\beta$ is set at an angle which is closer to $\beta=0°$ than $\beta=90°$ since the angular velocity during erection is closer to zero than maximum. One angle $\beta$ most closely meeting these conditions is an angle wherein $\beta=35°$. The erection path followed by the spin axis is shown in FIG. 8; however, reference is first made to FIGS. 6 and 7, in order to most easily understand the erection procedure when $\beta=35°$ and the angular velocity is between zero and maximum, i.e., $0 \leq \omega \leq$max.

Figure 6:
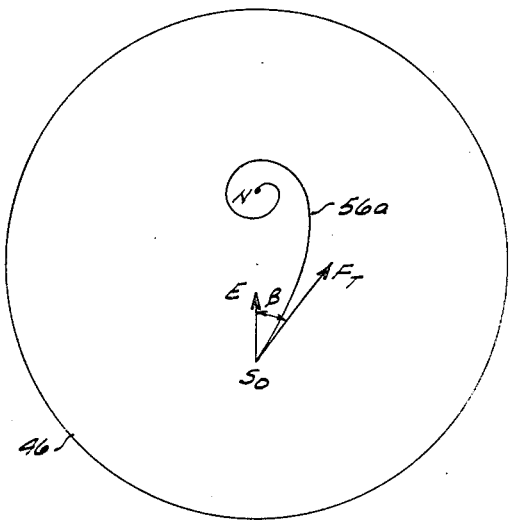
FIG. 6 is a view similar to FIGS. 4 and 5 when the angle is 35° and the angular velocity is zero.
Figure 7:
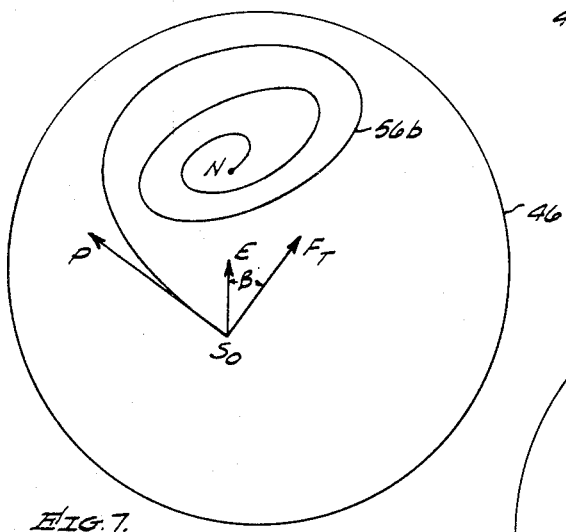
FIG 7 is a view similar to FIG. 6 but when the angular velocity is maximum.

FIG. 6 represents a path 56a followed by the spin axis when $\beta=35°$ and $\omega=0$. The spin axis then moves in the direction of force $F_T$, which is tangent to path 56a so long as $\omega=0$. The path thus followed has a moderately spiral shape. In FIG. 7, path 56b has a more marked spiral shape than that of path 56a because the angular velocity is at a maximum. However, because $\beta=35°$, the spiral of path 56b lies in between the shapes of paths 54b and 54d depicted in FIGS. 5(b) and (d) when $\omega=$maximum and $\beta=1°$ and 89°. The precessional force P is at all times tangent to path 56b because the angular velocity is maximum.

Figure 8:
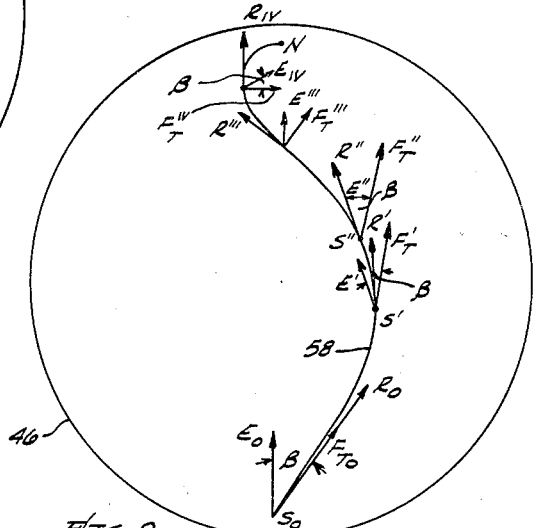
FIG. 8 is a view similar to FIGS. 6 and 7 when the angle is 35° and when the rotor angular velocity is brought from zero to maximum during erection.

FIG. 8 depicts a path 58 which is a combination of paths 56a and 56b shown in FIGS. 6 and 7 because the angular velocity is increasing from zero to maximum. In addition, because the time of erection is shorter than the time of maximizing motor spin and, therefore, $\omega$ has an average value closer to zero than to maximum, path 58 has a shape which is more similar to path 56a over a large portion. However, as the rotor spin increases, path 58 begins to take on an appearance which is more closely related to path 56b.

Because the gyro wheel is increasing in angular velocity as erection progresses, a correspondingly larger component of precessional force P is converted from the torque force $F_T$ in order to exert a resultant force R on the spin axis. Since precessional force P is orthogonal to torquer force $F_T$, the resultant force R thereof will have a direction intermediate forces P and $F_T$ such that path 58 will have a tangent which coincides with resultant force R. Thus, with reference to FIG. 8 at initiation of erection and rotor spin, the spin axis intersects the sphere at intersection $S_o$ and force $F_T$, which is set 35° from position error $E_o$, is tangent to path 58 to cause movement of the spin axis in the direction of force $F_{To}$. At a subsequent time at an intersection $S'$ when the rotor has been imparted with part of its angular velocity, a portion of torque force $F'_T$ is converted to precession so that the resultant force $R'$, which is also tangent to path 58, is offset from force $F'_T$ at an angle less than 90°. Since force $F_T$ is always directed 35° from error E, resultant force R will always have a component in the direction of error E tending to reduce the magnitude of error E. Further erection to intersections $S''$, $S'''$ and $S^{iv}$ is accompanied by larger precessional forces and correspondingly smaller torgue forces $F_T''$, $F_T'''$ and $F_T^{iv}$ so that resultant forces $R''$, $R'''$ and $R^{iv}$ approach the precessional force and are offset from their respective torque forces by an angle which approaches 90° and offset from their respective errors $E''$, $E'''$ and $E^{iv}$ by an angle approaching 55°. Therefore, erection progresses at a rapid rate within the shortest time and along the shortest allowable path.

Figure 9:
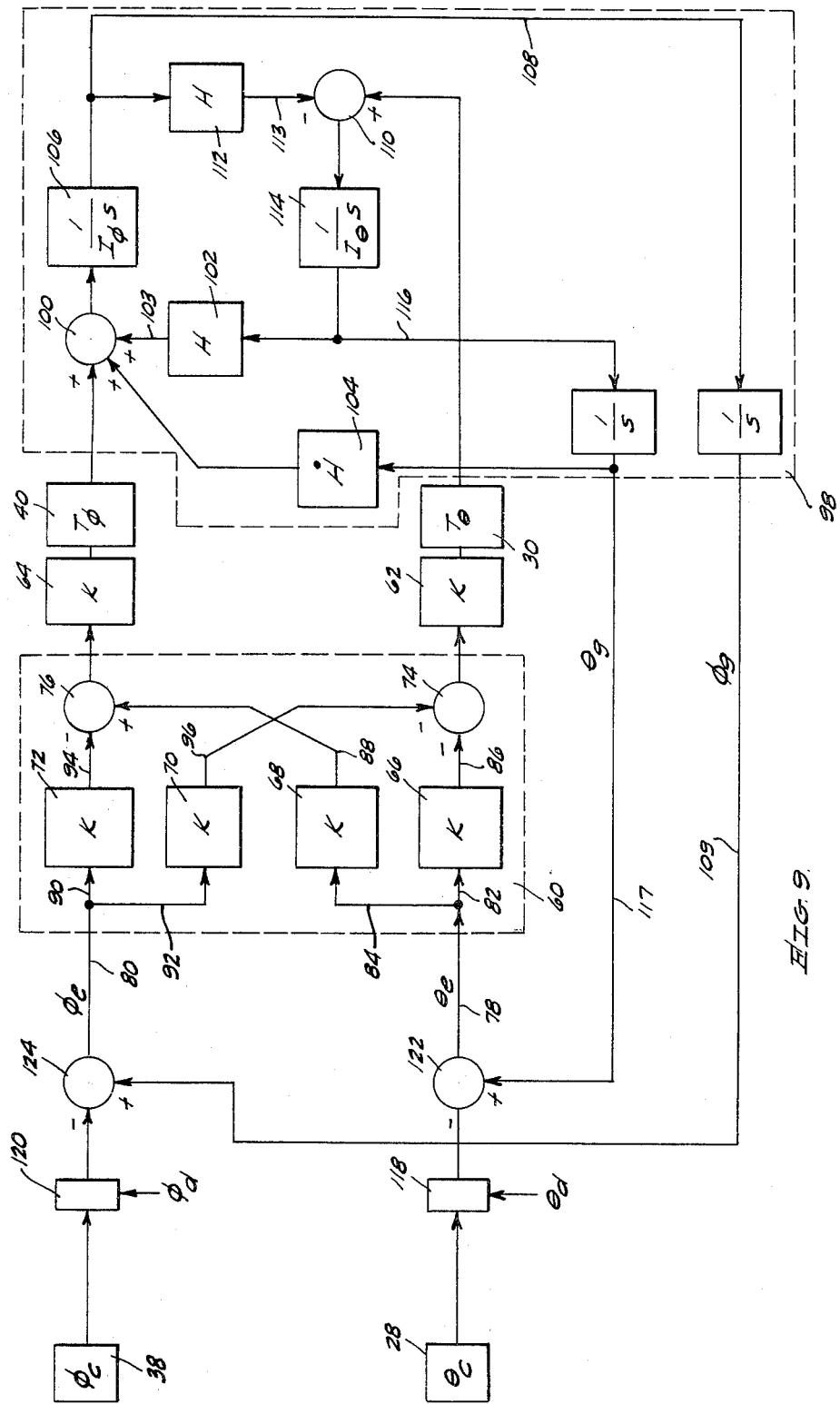
FIG 9 is a block diagram of the erection electronics and the gyro erection kinematics.

In order to obtain proper erection of the gyroscope depicted in FIGS. 1–8, the apparatus of FIGS. 9 and 10 is employed. This apparatus comprises a network 60 for summing the angular components representing the gimbal attitude error and amplifiers 62 and 64 capable of driving torquers 30 and 40 in order that torques $T_\theta$ and $T_\phi$ may be produced in response to the signals generated by network 60.

Network 60 comprises a shaping network or transformation matrix which combines the angular components of position error E, rotates these angular components through an angle $\beta$ in order to obtain the components of force couple F—F in terms of the angular gimbal coordinates. Four mechanisms 66, 68, 70 and 72 comprise electronic devices which express a particular rule for combining the electrical signals representing the error in the gimbal angles, $\phi_e$ and $\theta_e$, as coefficients of the transformation matrix. These coefficients are summed in a pair of summing devices 74 and 76 to provide a correction signal in terms of the angular components of position error E as rotated through an angle $\beta$.

Mechanisms 66 and 68 operate on component angle $\theta_e$ of the gimbal structure to impart specific gain thereto. In a similar manner, mechanisms 70 and 72 operate on component $\phi_e$ of the gimbal structure to impart specific gain thereto. The component error angles $\theta_e$ and $\phi_e$ are fed to their respective mechanisms through leads 78 and 80, the signals representing the angle $\theta_e$ being directed to mechanism 66 through a lead 82 and to mechanism 68 through a lead 84. Mechanism 66 imparts a specific gain to its signal and produces an output which is fed to summing device 74 through a lead 86. Mechanism 68, on the other hand, supplies its amplified signal to summing device 76 through a lead 88. Similarly, the signal from lead 80 is directed to mechanism 72 through a lead 90 and to mechanism 70 through a lead 92. The amplified signal from mechanism 72 is fed to summing device 76 through a lead 94 while the amplified signal from mechanism 70 is supplied to summing device 74 through a lead 96.

Preferably, mechanisms 66 and 72 impart gains of one value while mechanisms 68 and 70 impart gains of a value which is different from the value of the gains of mechanisms 66 and 72 such that the ratios between the gains of mechanisms 70 to 66 and mechanisms 68 to 72 have the combined numerical value of the tangent of angle $\beta$ through which force couple F—F is displaced from position error E. In combining the signals having these ratios in the proper polarity sense, summing devices 74 and 76 perform the error signal rotation through angle $\beta$.

In many cases, however, it may be desired, from a construction point of view, to form mechanisms 66, 68, 70 and 72 as unity gain amplifiers and to obtain the ratios by means of resistors placed in summing devices 74 and 76. Such construction is many times preferred and is depicted in FIG. 10.

Because of the kinematics of the inertial mechanism, disturbances are aroused thereby which affect the operation of the electronics and which are taken into consideration thereby. These disturbances along with other operations are illustrated schematically in FIG. 9 within the enclosure identified by indicia 98. The torque $T_\phi$ applied by torquer 40 is mechanically summed at a point 100 with the signal represented by a lead 103 stemming from the angular momentum H of the gyro wheel and the signal stemming from the time rate of change of angular momentum Ḣ, which values are expressed respectively by indicia 102 and 104. After being summed, these disturbances are mechanically integrated by the function expressed as $1/I_\phi S$ and as indicated by numeral 106, wherein symbol S represents the Laplace operator and $I_\phi$ is the equivalent inertia of the gyro wheel with respect to outer gimbal 14. The integrated disturbances produce gyro motion as represented by mechanical input leads 108 and 109 to act as a negative feedback to mechanisms 70 and 72.

In a similar manner, the torque $T_\theta$ applied by torquer 30 creates a disturbance which is mechanically summed at point 110 with signal stemming from the angular momentum H of the gyro wheel, as indicated by lead 113 and enclosure 112, respectively, in order to be mechanically integrated by the function $1/I_\theta S$, represented by enclosure 114, where $I_\theta$ is the equivalent inertia of the gyro wheel with respect to inner gimbal 12. This disturbance is directed to summing point 100 whenever the gyro wheel is provided with a specific value of angular momentum. The mechanical disturbance is also negatively fed back to mechanisms 66 and 68 through mechanical inputs 116 and 117. In the above discussion, it is to be understood that indicia 108 and 116 represent angular rates while indicia 109 and 117 represent angles.

To provide mechanisms 66–72 with the proper error signals, the angular components $\theta_c$ and $\phi_c$ from synchros 28 and 38 are combined with the desired angular components $\theta_d$ and $\phi_d$ of the attitude of the inertial mechanism within combining devices 118 and 120 and these combined signals are resolved in gimbal resolvers 122 and 124 along with the mechanical disturbance inputs $\theta_g$ and $\phi_g$. The combination of $\theta_c$, $\theta_d$ and $\theta_g$ gives the error component $\theta_e$ while the combination of $\phi_c$, $\phi_d$ and $\phi_g$ gives the error component $\phi_e$.

In operation, when the wheel angular momentum is zero, only the output disturbance from torque $T_\phi$ is fed back into resolver 124 and, similarly, only the output disturbance from torque $T_\theta$ is fed back into resolver 122 since, in both cases, there are no disturbances caused by the change in momentum per unit time Ḣ or by the mechanical signals depicted by leads 103 and 113, dependent upon the momentum H, which are both zero when the angular momentum is zero. With sufficient angular momentum, these values as depicted by leads 103 and 113 then create disturbances which are summed with the torque outputs.

Referring now to FIG. 10, a more detailed view of network 60 of FIG. 9 is shown. Here, mechanism 66 is depicted as including a pair of operational amplifiers 126 and 128 which, along with the associated resistors and capacitors, provide the desired gain. Mechanisms 68 and 70 are provided with operational amplifiers 130 and 132, respectively, and their associated electrical components to provide specified values of gain. Mechanism 70 additionally includes an amplifier 131 to provide the correct input to amplifier 132. However, if desired, amplifier 131 may be omitted if the connection from amplifier 132 were made to mechanism 72 between amplifiers 134 and 136. Mechanism 72, similarly to mechanisms 66, comprises a pair of operational amplifiers 134 and 136 to provide a specified gain. The signals from the several mechanisms are fed to summing devices 74 and 76 which include operational amplifiers 138 and 140. Resistors 142, 144, 146 and 148 are placed in the respective leads 86, 96, 94 and 88 and, as set forth above, are included within summing devices 74 and 76. Resistors 142 and 144 and resistors 146 and 148 are respectively combined to affect the gains of their respective mechanisms which gains may be unity so that the combined values thereof in summing devices 74 and 76 represent the angle $\beta$ between force couple F—F and position error E.

Although the invention has been described with reference to a particular embodiment thereof, it should be realized that various changes and modifications may be made without departing from the spirit and scope of the invention.

What is claimed is:

1. An erection system for rapid initial alignment of a gyroscope gimbal structure to a predetermined reference position comprising:
   gimbal attitude sensing means coupled to the gimbal structure for providing attitude error signals in response to deviation of the structure from the predetermined reference position;
   summing means coupled to said sensing means for providing attitude control signaus in response to the error signals; and
   torquing means coupled to said summing means and said gimbal structure for providing corrective torques thereto proportional to the control signals.

2. A system as in claim 1 wherein said summing means comprises shaping networks for combining and rotating the components of the error signals through an angle to obtain the components of the control signals in gimbal coordinates.

3. A system as in claim 2 wherein said shaping networks include cross-coupled transformation matrix mechanisms having specified gains to provide the angle.

4. A system as in claim 3 wherein said summing means includes summing devices connected to said transformation matrix mechanisms to provide ratios of the gains and the angle.

5. In a gyroscope having a rotor supported in a gimbal system, synchronous means for sensing the attitude of the gimbal system and for producing error signals and torquers for applying forces to the gimbal system, the improvement for erecting the gyroscope to a desired reference position at any value of rotor angular velocity comprising:
   a summing network connected to the synchronous means for comparing the attitude ot the desired position to determine any difference therebetween and for producing attitude correction signals proportional to the difference and
   torquer excitation means connected between said summing network and the torquers for supplying the correction signals thereto.

6. The improvement as in claim 5 wherein said summing network includes means for rotating the coordinates of the attitude correction signals with respect to the difference through a specified angle.

7. An apparatus for rapidly erecting a gyroscope from a first attitude to a desired attitude at any constant and changing values of rotor angular momentum comprising:
   means for detecting the deviation between the first attitude and the desired attitude in terms of gimbal coordinates,
   means for comparing and summing the coordinates of the deviation to provide a deviation correction in terms of gimbal coordinates, and
   means for supplying the coordinates of the correction to the gyroscope to provide correction forces.

8. Apparatus as in claim 7 wherein said comparing and summing means includes means for rotating the coordinates of the deviation through a specified angle.

9. Apparatus as in claim 7 wherein said comparing and summing means includes means for forming a ratio of the coordinates of the deviation to provide the specified angle.

10. Apparatus as in claim 7 wherein said comparing and summing means includes:
    means for separating each of the coordinates of the deviation into portions,
    means for amplifying the portions to impart each portion with a specific gain, and
    means for forming ratios of the portions of one of the deviation coordinates with the portions of another of the deviation coordinates to provide the specific angle.

References Cited
UNITED STATES PATENTS

| | | | |
|---|---|---|---|
| 2,567,948 | 9/1951 | Lane | 74—5.42 |
| 3,198,021 | 8/1965 | Cencel | 74—5.42 XR |

FRED C. MATTERN, Jr., Primary Examiner

M. ANTONAKAS, Assistant Examiner